United States Patent
Poling et al.

(10) Patent No.: US 11,247,251 B2
(45) Date of Patent: Feb. 15, 2022

(54) SPENT ACTIVATED CARBON AND INDUSTRIAL BY PRODUCT TREATMENT SYSTEM AND METHOD

(71) Applicant: MERCUTEK, LLC, Newtown, CT (US)

(72) Inventors: Christopher L. Poling, Bel Air, MD (US); Nico W. Scheeres, Boca Raton, FL (US)

(73) Assignee: Mercutek, LLC, Newtown, CT (US)

( * ) Notice: Subject to any disclaimer, the term of this patent is extended or adjusted under 35 U.S.C. 154(b) by 0 days.

(21) Appl. No.: 17/142,841

(22) Filed: Jan. 6, 2021

(65) Prior Publication Data

US 2021/0205866 A1 Jul. 8, 2021

Related U.S. Application Data

(60) Provisional application No. 62/957,687, filed on Jan. 6, 2020.

(51) Int. Cl.
| | |
|---|---|
| *B01D 53/78* | (2006.01) |
| *B01D 53/86* | (2006.01) |
| *B01D 53/90* | (2006.01) |
| *B09B 3/00* | (2006.01) |
| *C01B 32/354* | (2017.01) |

(52) U.S. Cl.
CPC ............ *B09B 3/0083* (2013.01); *B01D 53/78* (2013.01); *B01D 53/8665* (2013.01); *B01D 53/90* (2013.01); *C01B 32/354* (2017.08); *B01D 2251/30* (2013.01); *B01D 2257/302* (2013.01); *B01D 2257/404* (2013.01); *B01D 2257/602* (2013.01)

(58) Field of Classification Search
CPC ...... A62D 3/33; A62D 2101/43; B01D 53/78; B01D 53/8665; B01D 53/90; B01D 2251/30; B01D 2257/302; B01D 2257/404; B01D 2257/60; B01D 2257/602; B09B 3/0083; B09B 5/00; B09C 1/08; C01B 32/354; C01B 32/378
See application file for complete search history.

(56) References Cited

U.S. PATENT DOCUMENTS

2015/0038321 A1  2/2015  D'Amico et al.
2017/0065933 A1*  3/2017  D'Amico ............... B01D 53/78

* cited by examiner

*Primary Examiner* — Timothy C Vanoy
(74) *Attorney, Agent, or Firm* — Richard P. Gilly; Archer & Greiner, PC

(57) ABSTRACT

Methods for treating an industrial byproduct, such as spent, granular, activated carbon, dredge spoils, or contaminated soils involve integrated steps to clean, concentrate, separate and/or otherwise collect hazardous and/or desired materials from such industrial byproducts. The cleaned, concentrated, separated, or collected materials may involve sufficient quantities to be useful to subsequent processors, raw materials, additives, and the like. Other treatment methods involve retaining the clean material stream at sufficient temperatures for sufficient time to separate and concentrate desired material for recovery therefrom, such as precious metals and rare earth elements.

20 Claims, 5 Drawing Sheets

Results Summary

| | Test 5 (Inlet) | Test 1 (Outlet) | Test 2 (Outlet) | Test 3 (Outlet) | Test 4 (Outlet) | 4 Test Avg (Outlet) | Avg Emission Rate | Avg Capture Rate |
|---|---|---|---|---|---|---|---|---|
| | ugms/m³ | ugms/m³ | ugms/m³ | ugms/m³ | ugms/m³ | ugms/m³ | gms/hr | % |
| Antimony | 33750.78 | 14565.38 | 13187.38 | 25570.24 | 9063.87 | 15596.72 | 1.96 | 97.23% |
| Arsenic | 454337.38 | 198726.00 | 191816.51 | 138130.69 | 201491.70 | 182541.22 | 22.93 | 97.59% |
| Beryllium | 0.00 | 0.00 | 0.00 | 0.00 | 0.00 | 0.00 | 0.00 | n/a |
| Bismuth | 10271.27 | 3319.96 | 3331.55 | 4176.04 | 2412.68 | 3310.06 | 0.42 | 98.06% |
| Cadmium | 86973.16 | 35381.48 | 27952.21 | 25184.76 | 20083.96 | 27150.60 | 3.41 | 98.12% |
| Chromium | 47.87 | 5.83 | 2.02 | 45.81 | 2.56 | 14.05 | 0.00 | 98.25% |
| Copper | 12964.84 | 5419.26 | 3558.70 | 1773.21 | 2947.39 | 3424.64 | 0.43 | 98.41% |
| Lead | 243395.02 | 3084.09 | 3836.33 | 13170.60 | 4897.10 | 6247.03 | 0.78 | 99.85% |
| Nickel | 33.43 | 6.96 | 3.23 | 18.31 | 3.69 | 8.05 | 0.00 | 98.56% |
| Selenium | 89082.58 | 56610.37 | 32305.94 | 21522.69 | 34690.48 | 36282.37 | 4.56 | 97.55% |
| Silver | 12.79 | 3.66 | 6.37 | 2.42 | 9.98 | 5.61 | 0.00 | 97.38% |
| Thallium | 343998.30 | 218185.81 | 169101.39 | 212014.55 | 116721.73 | 179005.87 | 22.49 | 96.87% |
| Tin | 1268.90 | 114.99 | 129.98 | 106.65 | 115.42 | 116.76 | 0.01 | 99.45% |
| Vanadium | 22.07 | 6.13 | 5.73 | 4.18 | 4.67 | 5.18 | 0.00 | 98.59% |
| Zinc | 32452.67 | 11027.23 | 9149.14 | 9058.80 | 6259.94 | 8873.78 | 1.11 | 98.36% |
| Rubidium | 3.25 | 0.00 | 0.00 | 0.00 | 0.00 | 0.00 | 0.00 | 100.00% |
| Tellurium | 8076.04 | 5184.63 | 5190.23 | 5885.73 | 2874.73 | 4783.83 | 0.60 | 96.44% |
| Mercury | 117848.38 | 122433.32 | 97608.29 | 85707.79 | 83342.90 | 97273.08 | 12.22 | 95.04% |
| Total Metals | 1434538.71 | 674075.10 | 557185.01 | 542372.47 | 484922.78 | 564638.84 | 70.94 | 97.64% |
| Total Particulates | 2676994.31 | 1017979.65 | 890279.16 | 844490.15 | 770970.92 | 880929.97 | 110.68 | 98.02% |
| Rate Rm³/hr | 2095 | 126 | 129 | 125 | 123 | 125.64 | | |

Fig. 2

| Spent Activated Carbon | | | | | | |
|---|---|---|---|---|---|---|
| Mass | 2500 | lb | 434.87 | lb | − | 82.6% |
| Carbon | 72.7 | % | 1.4 | % | − | 98.1% |
| Mercury | 126 | ppm | 0.7 | ppm | − | 99.4% |
| Cadmium | 17.46 | ppm | 1.4 | ppm | − | 92.0% |
|  |  |  |  |  |  |  |
| Precious Metals | 550.8 | ppm | 2172 | ppm | + | 294.3% |

Fig. 3

SPENT ACTIVATED CARBON AND INDUSTRIAL BY PRODUCT TREATMENT SYSTEM AND METHOD

CROSS-REFERENCE TO RELATED APPLICATIONS

This patent application claims the priority benefit of U.S. Prov. Ser. No. 62/957,687, previously filed Jan. 6, 2020, having the same title and inventors as herewith, and the entire contents of such previously filed patent application are incorporated by reference herein.

FIELD

The present disclosure relates to treatment of spent activated carbon and industrial byproducts.

BACKGROUND

Granular activated carbon and other sorbents may be used in mining operations, smelting operations, refining operations, power plants, incinerators, and other industries worldwide to capture forms of heavy metals and other contaminants from a gas stream. In its virgin state, the activated carbon is a form of carbon that has been processed to make the carbon extremely porous resulting in a large surface area available for adsorption. This extremely porous nature and method of application in the gas stream also allows it to absorb a portion of precious metals and rare earth metals which are carried with the heavy metals and contaminants during industrial processing.

This spent granular activated carbon may be considered a specialty by-product which is often not recycled due to the heavy metals and other contaminants absorbed by the carbon as a result of its use in industrial processes.

Treatment of spent granular activated carbons faces obstacles and challenges not generally faced by other industrial byproducts. So, for example, treatment protocols for spent powder/powdered activated carbon ("PAC") may be ineffectual when applied to granular activated carbons, for a number of reasons, such as the much coarser particle size compared to PAC, adverse effects of higher moisture content in subsequent processing, including treatment complexities to account for this and other physical parameters of the granular activated carbon.

Still further, the applications in which granular activated carbon may be used often introduce challenges and obstacles to achieving processing objectives in an efficacious or cost-effective manner. For example, many industrial processes making use of granular activated carbon, such as mining operations, smelting operations, refining operations, power plants, and incinerators, cause the granular activated carbon to become reacted, mixed or otherwise contaminated with various contaminants which present specific treatment challenges different from mercury capture or other treatment protocols, such as a wider variety of heavy metals, hydrocarbons, or chemicals such as PCB's, Cyanide, PFOS's (Perfluorooctanesulfonic Acids), PFOC's (Perfluorooctanoic Acids), PFA's (Perfluoroalkyl and Polyfluoroalkyl Substances) and Dioxin Furans.

As such, the used ("spent") granular activated carbon (referred to at times herein by the shorthand "carbon") is not only generally laden with heavy metals and other regulated or undesirable contaminants, such as these listed above, but also presents either a treatment challenge, a waste disposal dilemma (or both). So, for example, with regard to heavy metal in the form of mercury, where treatment of spent activated carbon is not cost effective or otherwise effective to reduce its presence to less than two hundred sixty (260) ppm mercury so it may be landfilled or encapsulated in concrete, the spent activated carbon is in a high mercury subcategory and is banned from landfilling. It is the spent activated carbon containing greater than two hundred sixty (260) ppm mercury which is now accumulating in warehouses and in abandoned mines at an estimated rate of one thousand (1000) tons per year. Further, the problem of disposal of spent activated carbon is not unique to the United States of America.

Treatment protocols for spent granular activated carbon, whether above or below the high mercury threshold classification, suffer from various other drawbacks and disadvantages, including costly and sometimes ineffective extra processing steps. For example, the capture of spent activated carbon typically involves pollution control device such as a baghouse, filter bed or electrostatic precipitator. The spent carbon may be captured as an independent material stream or the spent carbon may be mixed with other industrial by-products. When the spent carbon is not able to be land filled, additional processes and related expenses may be incurred if such spent carbon is sent to a smelter to be blended with other raw materials and destroyed.

The efficiency of established treatment protocols with predictable results may often be thwarted since the properties and composition of the spent carbon can be significantly affected by the specific industrial process, raw materials, adsorption agents, design or operation of the carbon filter system. Thus, effective processing and treatment often requires the expense, time and related inefficiencies of evaluating the constituent chemical and physical characteristics of the spent carbon on an individual mine or facility basis.

For example, treatment of the spent carbon from a mine site may be complicated by its contamination with cyanide or arsenic. The spent carbon from a smelter operation may be contaminated with hydrocarbons and/or dioxin furans. In addition to various additional, process-specific contaminants for the associated industrial process, the physical parameters of the carbon itself may in effect alter the pH and concentration or dosage of the required reagent solution for each specific facility.

The precious metals and rare earths which have been identified within these waste streams have historically been abandoned due to the challenges of separating them from the contaminants absorbed by the carbon. Even if the content of precious metals were to be high enough to justify processing steps directed at precious metal/rare earth recovery, the processing steps of the current art suffer from various drawbacks and disadvantages. For example, currently, recovery processing generally involves sending the material to a smelter, where the extent of contamination of the material requires it to be blended with still other materials at a low rate over time. Such blending often means still more process steps in which the contaminants themselves are re-released and re-captured by fresh activated carbon, which constitute larger process operations, with associated additional steps, equipment, and expense. As such, smelter-related recovery of the current art, among its disadvantages, generally requires the smelter to be paid a premium, which may not be economically attractive for the generator of the spent materials.

In view of the foregoing challenges, current systems and methods for treatment of powder activated carbon or other CCRs, such as those set out in U.S. Pat. No. 9,884,311, are not readily adaptable or applicable to treat certain industrial by-products, such as granular activated carbon, or to treat certain waste streams; or, still further, such prior art methods do not teach the steps and protocols required to be useful or efficient when used with certain waste streams, such as those waste streams from mining operations, smelting operations, refining operations, and incinerators, and are thus often not suitable or efficient for removal of certain heavy metals, precious metals, and rare earths, and/or for treating granular activated carbon or certain industrial waste streams.

Industrial byproducts such as smelter waste (i.e., sludge), gangue, dredge spoil or contaminated soil plumes are generated by industries which abandon the materials on site or cause the materials to be concentrated in an uncontrolled manner as a result of poor environmental containments or practices. These materials may have metallurgical value to the generators which is deemed unrecoverable as in the examples of manganese gangue or weak acid lead sludge. The concentrations of the valuable minerals are reduced by high concentrations of contaminants such as heavy metals, dioxin furans, PCB's, Hydrocarbons and other contaminants.

Other materials such as contaminated soil plumes or dredge spoils are either abandoned as a result of poor environmental controls or routine accumulation of debris in waterways due to run off. These materials present a clear and present environmental hazard preventing the physical location from being utilized until the hazard has been mitigated. Present practices require these materials to be physically removed from their in-situ location for containment or processing.

In view of the foregoing, it would be desirable to overcome the drawbacks and disadvantages of current treatment systems and methods to efficiently and effectively clean certain waste streams heretofore resistant to current decontamination methods, and to more efficiently or to more effectively recover precious metals, rare earths, or other heretofore difficult-to-segregate elements or compounds.

SUMMARY

The key differences in processing spent activated carbon and/or industrial byproducts, dredge spoils or contaminated soils compared to ashes or dusts containing mercury is as follows:
  May require higher temperatures
  May require particle size reduction
  May require longer retention times
  May require preliminary drying
  May require homogenous blending
  May require varying reagents
  May require varying reagent dosage concentrations
  May require downstream thermal oxidation. SOx or NOx scrubbers One or more of the above-listed processing steps may be associated with treating spent activated carbon and/or industrial byproducts. One suitable method for accomplishing some or all of these steps is a rotary kiln, or calciner combined with a gas reactor. The rotary kiln or calciner may be referred to at times as a volatilization vessel which forces the contaminants into a gas stream using temperature and time. The gas reactor allows this gas stream of contaminants to come into contact with various reagents. The reagents combine with the heavy metals and metals to form a particulate which is removed from the gas stream. There may be additional treatment systems after the gas reactor designed to mitigate SOx, NOx, and/or Hydrocarbons. Each of these scrubbers are a 'bolt-on' technology but none have ever been applied to the preceding process on spent activated carbon and industrial byproduct treatment systems and methods as disclosed herein.

In an illustrative embodiment, the treatment systems and methods disclosed herein relate to the removal of heavy metals and other contaminants from spent activated carbon, which spent activated carbon has previously been used for heavy-metal pollution reduction. The concentration and reduction of the remaining carbon into an ash has been found to increase the percentage of recoverable precious metals or rare earths.

In an illustrative embodiment, a method for treating spent carbon includes collecting the spent carbon and heating the collected materials at high temperatures to separate at least one heavy metal from the collected spent carbon. In the example of precious metal recovery from spent carbon, this temperature is maintained long enough to force the carbon itself into controlled volatilization in order to create a clean ash which still retains the precious metals which can then be sent for refining.

In one possible implementation, the method relates to not only removing the mercury from the carbon but also reducing that carbon to ash in a single step as part of a carefully balanced volatilization process. Indirect heat is applied, and the material is retained at specific temperatures for a specific period at a specific pressure. The new process generates additional air flow with additional contaminants. This dictates a significant modification to the downstream gas reactor to accommodate the increased gas volume, while still retaining a continuous closed loop reagent process. Heavy metal precipitate is continually generated and continually removed from the liquid stream. A further unique step may allow the actual exhaust from the gas reactor process be used as combustion air back into the volatilization vessel. This step allows the volatilization vessel itself to function as a thermal oxidizer and prevent emissions of hydrogen sulfide.

In another illustrative embodiment, a method for treating one or more industrial byproducts, dredge spoils or contaminated soils is disclosed. The method includes collecting the industrial byproducts, dredge spoils or contaminated soils and heating the collected materials at high temperatures to separate at least one heavy metal or contaminant from the industrial byproducts, dredge spoils or contaminated soils. These materials were previously abandoned or landfilled. The waste industrial byproduct becomes a recyclable commodity and the dredge spoil or previously contaminated soils may be returned as clean fill material or recycled back into an industrial process.

Each of these embodiments may include indirect heating of the materials to volatilization temperatures of the heavy metals, contaminants or carbon.

Additionally, the above described methods for recovering precious metals or rare earths, or for decontaminating byproducts, spoils, or soils, may include providing a water soluble alkaline-earth metal sulfide or polysulfide, combining the heavy metal or other waste stream with the water soluble alkaline-earth metal sulfide or polysulfide to create a combined stream, and removing at least a portion of one heavy metal or contaminant from the combined stream.

In an illustrative embodiment, the method may include providing a catalyst to create the combined stream, and/or providing a hyperdispersant or surfactant to create the combined stream.

Advantages of the treatment systems and methods disclosed herein include the ability to treat the spent carbon and/or industrial byproducts, dredge spoils or contaminated soils before being landfilled or otherwise disposed of, and allowing the treated carbon ash and/or industrial byproducts, dredge spoils or contaminated soils to be recycled back into other uses to minimize the potential release of heavy metals. Through the combination of a specialized thermal desorption process and use of chemical reagents, spent carbon and/or industrial byproducts, dredge spoils or contaminated soils can be recycled, precious metals or rare earths recovered, and dredge spoils or contaminated soils recycled. Additionally, through a similar process of heat application in an inert environment, heavy metals can be removed from spent carbon and/or industrial byproducts, dredge spoils or contaminated soils and captured with a chemical reagent as a precipitated solid residue. In either case the resulting residue will be highly concentrated and in a stable non-leachable form. This precipitate residue can then be disposed of, recycled or used as a salable raw material in other processes.

In an illustrative embodiment, the method may be incorporated as a stationary facility processing several thousand tons per year of spent carbon and/or industrial byproducts, dredge spoils or contaminated soils.

The same process system can also be made portable to specific job sites for temporary application of the process. The overall processing volume would be limited by the material itself and the physical limits of the indirect heat transfer equipment to be transported.

The clean material stream may be returned to the generator site or sent for further refining.

The heating may include a lengthy retention time to volatilize the remaining carbon and/or hydrocarbons in the feed material creating a concentrated clean material stream. The concentrated clean material stream may be returned to the generator site or sent for further refining of precious metals or rare earths.

The heating may further include heating the at least one of the spent activated carbon and/or industrial byproducts, dredge spoils or contaminated soils in an inert atmosphere. Further, the combining may include combining the heavy metal stream with the water soluble alkaline-earth metal sulfide and a catalyst and/or a surfactant or hyperdispersant.

In certain further implementations of this disclosure, a system and related method can be employed for recovering a desired material from a first bulk quantity of a contaminated industrial byproduct. The method involves receiving the contaminated industrial byproduct from one of the following industrial processes: mining operations, smelting operations, contaminated soils, or refining operations. The method is employed where it has been known or otherwise determined that the contaminated industrial byproduct contains not only a desired material for recovery, but also a plurality of contaminants, such contaminants including at least one contaminant having a sublimation point different from the sublimation point of mercury. In these implementations, the bulk quantity of the industrial byproduct is heated in a controlled atmosphere, such as one atmosphere when at ambient temperature, such heating taking place for a time period and at a temperature sufficient to separate the predetermined contaminant and thereby form a contaminant stream and a cleaned stream.

In most implementations, the contaminant stream is gaseous, such as a gas stream, and the cleaned stream is solid or suspended solids, such as powder or slurry, respectively. Depending on the industrial byproduct being treated, the predetermined contaminant, and the desired material for recovery, the cleaned stream itself may consist essentially of the desired material for recovery, such as when sludge, dredge, spoils, or contaminated soils are processed for desired materials useful as raw or process feed materials, like lead, tin, and bismuth; or the cleaned stream may include the desired material as a component, constituent portion, or percentage of the cleaned stream, such as in the case of ashed, spent, granular activated carbon, which cleaned stream may thereby include the desired material in the form of one or more precious metals or rare earth metals, and which cleaned stream may be subjected to further processing for recovery of the desired material.

Whether the cleaned stream consists essentially of the desired material or merely comprises the desired material, the treatment processes disclosed herein include treatment of a first, bulk quantity of the industrial byproduct and generating the cleaned stream as a second bulk quantity, and the second bulk quantity of the cleaned stream is less than the first bulk quantity. In some applications, the mass reduction between first and second bulk quantities may be as much as 50%, such as with ashed, spent granular activated carbon or sludge and dredge spoils after treatment hereunder. Mass reduction may be greater for the foregoing industrial byproducts or in still other applications, depending on the moisture, loss-on-ignition (LOI), or other characteristics of the industrial byproduct treated. Regardless of the mass reduction amount, the cleaned stream is substantially free of the plurality of contaminants.

The method further involves collecting the second bulk quantity which includes or may consist essentially of the desired material from the cleaned stream, again, the second bulk quantity being less than the first bulk quantity of the contaminated byproduct. In this way, the desired material has been separated from the contaminants and can be recovered more readily from the second, bulk quantity.

In certain implementations, the contaminant stream may be further treated with a reagent, such as a water-soluble, alkaline-earth metal sulfite or polysulfide to form a non-leachable, stable compound in the form of a particulate. The compound may be formed by the reagent causing the contaminants to form a precipitate, in other words, the contaminant is removed from the contaminant stream by precipitation.

In certain implementations, the above-described processing may be used when the contaminated industrial byproduct is in the form of a weak acid sludge from a lead smelting operation. In this application, the weak acid sludge has been determined to have two predetermined contaminants, arsenic and cadmium, among others. The desired materials for recovery include lead, tin, and bismuth. Heating of the weak acid sludge involves a timed period ranging from sixty minutes to about ninety minutes and at a temperature ranging between about 450° C. and about 550° C.

The disclosed methods and system may likewise be used to concentrate precious metals or rare earth metals found in relatively low concentrations in a contaminated industrial byproduct to higher concentrations. So, for example, in cases where it has been determined that spent, granular activated carbon is likely to contain precious metals, such as gold, silver, and platinum, or rare earth metals, the spent activated carbon is subjected to heat selected from the range of about 510° C. to about 732° C. for a period of time so as to expose the granular activate carbon to controlled combustion, referred to herein as "ashing," which process reduces the spent granular activated carbon to an ashed form. The process likewise may give off volatiles comprising carbon monoxide and hydrogen. In this manner, the spent, granular activated carbon undergoes a controlled combustion process resulting in an ashed carbon in which precious metals have been concentrated. The foregoing "ashing" process may also be applied to spent activated carbons which are known to have rare earth metals and result in concentration of such rare earth metals.

These and other aspects of the disclosure may be understood more readily from the following description and the appended drawings.

BRIEF DESCRIPTION OF THE DRAWINGS

One or more implementations of the spent activated carbon and/or industrial byproduct treatment systems and methods is illustrated in the figures of the accompanying drawing, which is meant to be exemplary and not limiting, in which like references are intended to refer to like or corresponding parts, and in which:

FIG. 2 is a table that sets out test results for an industrial byproduct comprising a weak acid sludge from smelting operations;

FIG. 3 is a table that sets out test results for an industrial byproduct comprising spent granular activated carbon from mining operations;

DETAILED DESCRIPTION

Figure 1:
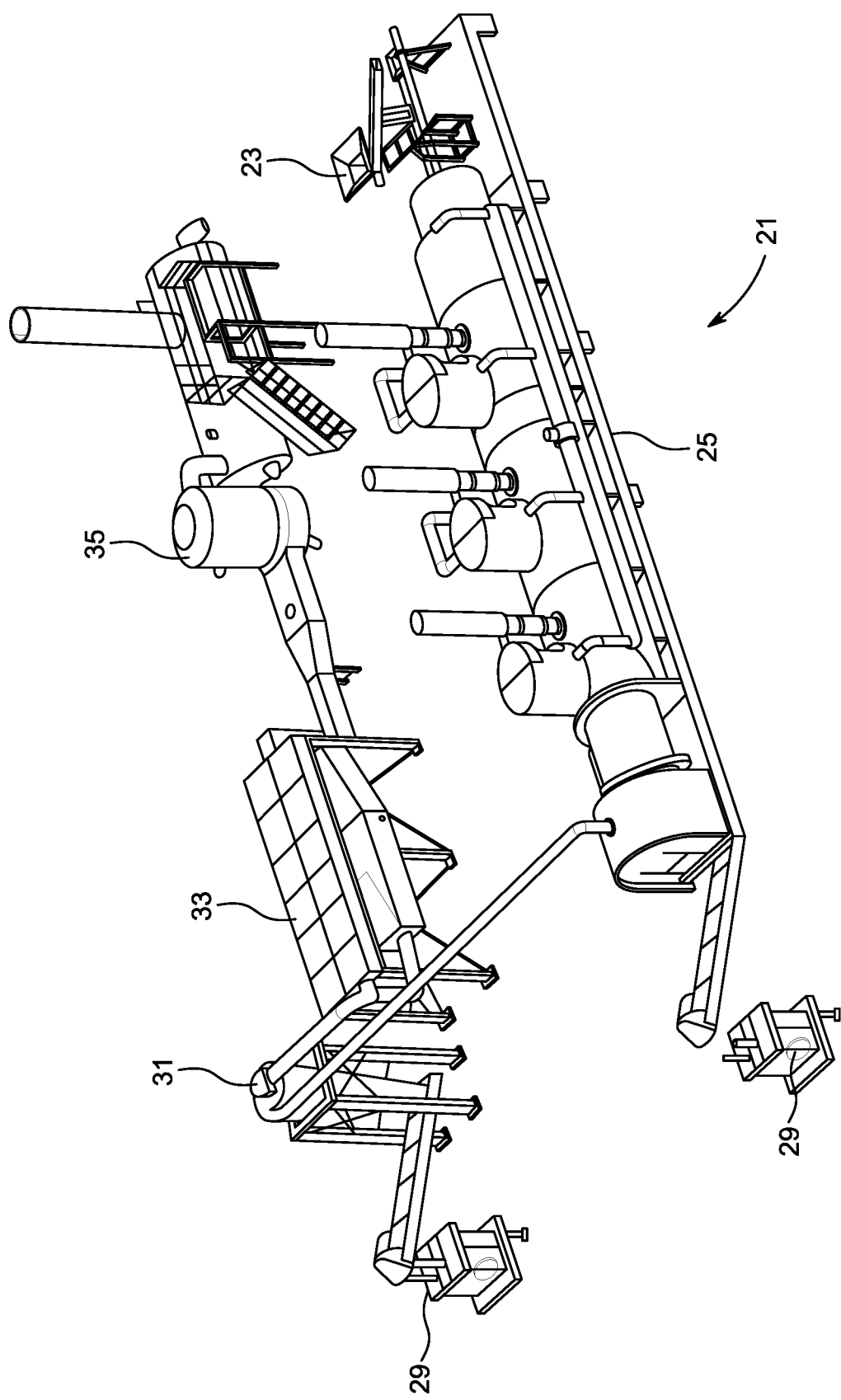
FIG. 1 illustrates a diagram of an embodiment of an apparatus and related methods for treating spent activated carbon and/or industrial byproducts.

Detailed implementations of the present invention are disclosed herein, however, it is to be understood that the disclosed implementations are merely exemplary of the invention, which may be embodied in various forms. Therefore, specific functional details disclosed herein are not to be interpreted as limiting, but merely as a basis for the claims and as a representative basis for teaching those skilled in the art to variously employ the present invention.

A treatment system 21 and related methods for treating and/or reducing pollution from spent activated carbon and/or industrial byproducts, dredge spoils or contaminated soils while concentrating the precious metals component, rare earths, or valuable commodity thereof according to various possible implementations, is shown and described with reference to FIGS. 1 and 4. Spent carbon and/or industrial byproducts, dredge spoils or contaminated soils 23 may be received or collected from a pollution control device, dredge or contaminated soil plume (not shown). Such waste materials are collected in bulk, including, for example, amounts ranging from about 1 ton to about 200,000 tons, although smaller and larger amounts are likewise amenable to treatment hereunder. System throughputs may range from about 1 ton per hour to about 20 tons per hour, although portable, smaller systems and throughputs of the bulk material are likewise contemplated, as are larger throughputs and systems, depending on the waste stream and materials to be recovered. The pollution control device may be a particulate collection system, for example, a baghouse, bag filter, cyclone or an electrostatic precipitator (ESP), and the bulk materials may be transferred to storage, for example, a stockpile, silo or superstacks.

From storage the materials 23 to be processed are transferred (FIG. 4, step 24) to an indirectly heated volatilization vessel or calciner 25. Indirectly heated volatilization vessel or calciner 25 may assume a variety of forms but generally is to be configured so as to have the appropriate and suitable throughput for the anticipated amount of industrial byproduct or waste material to be heated therein, to allow such material to be subjected to temperatures or temperature ranges required by the processing parameters set out herein, and to be exposed to such temperatures for the requisite time periods disclosed herein, with an appropriately controlled atmosphere for inducing the desired reactions and treatments as discussed herein. The spent activated carbon and/or industrial byproducts, dredge spoils or contaminated soils are transferred to or through the volatilization vessel or calciner 25 via a metering screw or other suitable device (FIG. 4, step 26). It should be appreciated by those skilled in the art that the exact configuration of the conveying mechanism, whether by metering screw or other means, and the configuration of the volatilization zone or vessel 25, as well as their spatial relation to each other, may be varied depending on the particular application, and so means or method of transferring the spent activated carbon and/or industrial byproducts, dredge spoils or contaminated soils to the volatilization vessel beyond that illustrated may be used.

To volatilize the heavy metals and/or other contaminants captured in the spent activated carbon and/or industrial byproducts, dredge spoils or contaminated soils, heat is added at a predetermined temperature range to the spent activated carbon and/or industrial byproducts, dredge spoils or contaminated soils for a predetermined time range which, in this implementation, is in a volatilization zone of the calciner 25. The predetermined temperature ranges and predetermined time period ranges have been found to be those suitable or applicable for the given contaminated industrial byproduct formed by the associated industrial process and generating the associated waste stream, and such predetermined temperature exposures and time exposures will vary as a function of many variables, including, for example, the bulk chemical composition of the byproduct, the percentages of contaminants it has generally absorbed, and the materials to be recovered from the contaminated byproduct, if any. For example, arsenic's sublimation point is about six hundred fifteen (615) degrees Celsius or about one thousand, one hundred and thirty-seven (1137) degrees Fahrenheit, after which point arsenic exists as a gas.

In the case of treatment by the systems and methods for spent carbon, spent carbon has a sublimation temperature between five hundred ten degrees Celsius (510 C) or nine hundred fifty degrees Fahrenheit (950 F) and seven hundred thirty two degrees Celsius (732 C) or one thousand three hundred fifty degrees Fahrenheit (1350 F). At this temperature, in a controlled atmosphere, for a specific period the carbon will reduce to ash giving off volatiles, forming CO and generating hydrogen which is part of the controlled combustion process. This gas stream may either be utilized in the ashing process as a source of heat or separated along with the heavy metal gas stream and used as combustion air after heavy metal removal.

In other words, the heavy metals and other contaminants captured in the spent activated carbon and/or industrial byproducts, dredge spoils or contaminated soils will vaporize into a gas stream, generally combined with air, leaving a cleaned carbon stream, or ashed carbon stream or cleaned industrial byproducts, dredge spoils or contaminated soil stream that may be removed and/or recycled or sent for precious metals recovery. In the above illustrative embodiments, the spent activated carbon and/or industrial byproducts, dredge spoils or contaminated soils, may be heated to the point of combustion to create a residual combustion ash, and such residual combustion ash may be collected and sent for further processing.

In an illustrative embodiment, waste heat or excess heat from one or more processes within the smelter, mine, or other industrial process may be used to elevate the temperature of the spent activated carbon and/or industrial byproducts, dredge spoils or contaminated soils to the point of causing the heavy metals to release from the spent activated carbon and/or industrial byproducts, dredge spoils or contaminated soils. In an illustrative embodiment, heat may be added to the spent activated carbon and/or industrial byproducts, dredge spoils or contaminated soils at the metering screw, and/or at a volatilization vessel surrounding or following the metering screw.

In still a further implementation of this disclosure, the processing of bulk industrial byproduct 23 includes not only feeding it (step 24) into a heated environment in a controlled atmosphere over a period of time (such as in volatilization vessel 25), but also selecting heating temperatures and exposure times suitable for recovering a desired material from the bulk quantity of the contaminated industrial byproduct. The industrial byproducts which are received, according to this disclosure, come from an industrial process consisting of either mining operations, smelting or other metallurgical operations; from contaminated soils, from refining operations, or from chemical manufacturing operations; or from a combination or mixture of any of the foregoing. The above-referenced contaminated industrial byproduct from the above-referenced industrial processes is known to contain multiple contaminants, including at least one predetermined contaminant. The processes disclosed herein are useful for contaminants having sublimation points or other volatilization characteristics which are different from those of the contaminant mercury which may or may not be present in the selected industrial byproduct.

According to one possible implementation, for the above-described industrial byproduct received for processing, a determination is made that such byproduct has a likelihood that the material sought to be recovered is present in such byproduct. Such determination step may be performed in any number of ways, either actively by sample testing, or based on industry knowledge related to the typical contaminants associated with the industrial byproduct itself or the associated industrial process in which the raw material was initially used, or based on other studies or knowledge.

Having determined that a desired material is likely to be present, the heating of the bulk quantity of the industrial byproduct takes place, preferably in the volatilization zone or other heated controlled atmosphere of a calciner or similar device through which the bulk quantity is fed. In the case of lead smelting operations and other industry processes with waste streams similar to lead smelting operations, one suitable treatment protocol involves heating the sludge, soils, gangue, dredge spoil, tailing, soil plume, or similar waste generated by the associated industries for a time ranging between 60 to 90 minutes, in a controlled atmosphere (such as at one atmosphere when at ambient temperature), to temperatures ranging between about 450° C. and about 550° C., and limiting the airflow during such treatment to between −3.0 to +3.0 PSI.

When the industrial byproduct is in the form of spent activated carbon, that is, spent granular activated carbon, the treatment protocol set forth herein not only includes heating temperatures and residency times sufficient to separate contaminants from such spent activated carbon, but also may include steps to reduce the spent activated carbon to ash in a controlled combustion, which carbon ash thereby includes a higher concentration of materials identified as likely to be present and which are desired for recovery, such as, for example, precious metals and/or rare earth metals. Precious metals may include, without limitation, gold, silver, platinum, and titanium. Rare earth metals or "rare earths" may include, without limitation, any number of elements relatively difficult to obtain, refine, or purchase, or having unique or important properties for certain applications, such applications including, without limitation, semiconductor or superconductor manufacturing, battery and power storage technologies, nanotechnologies, and the like.

Figure 4:
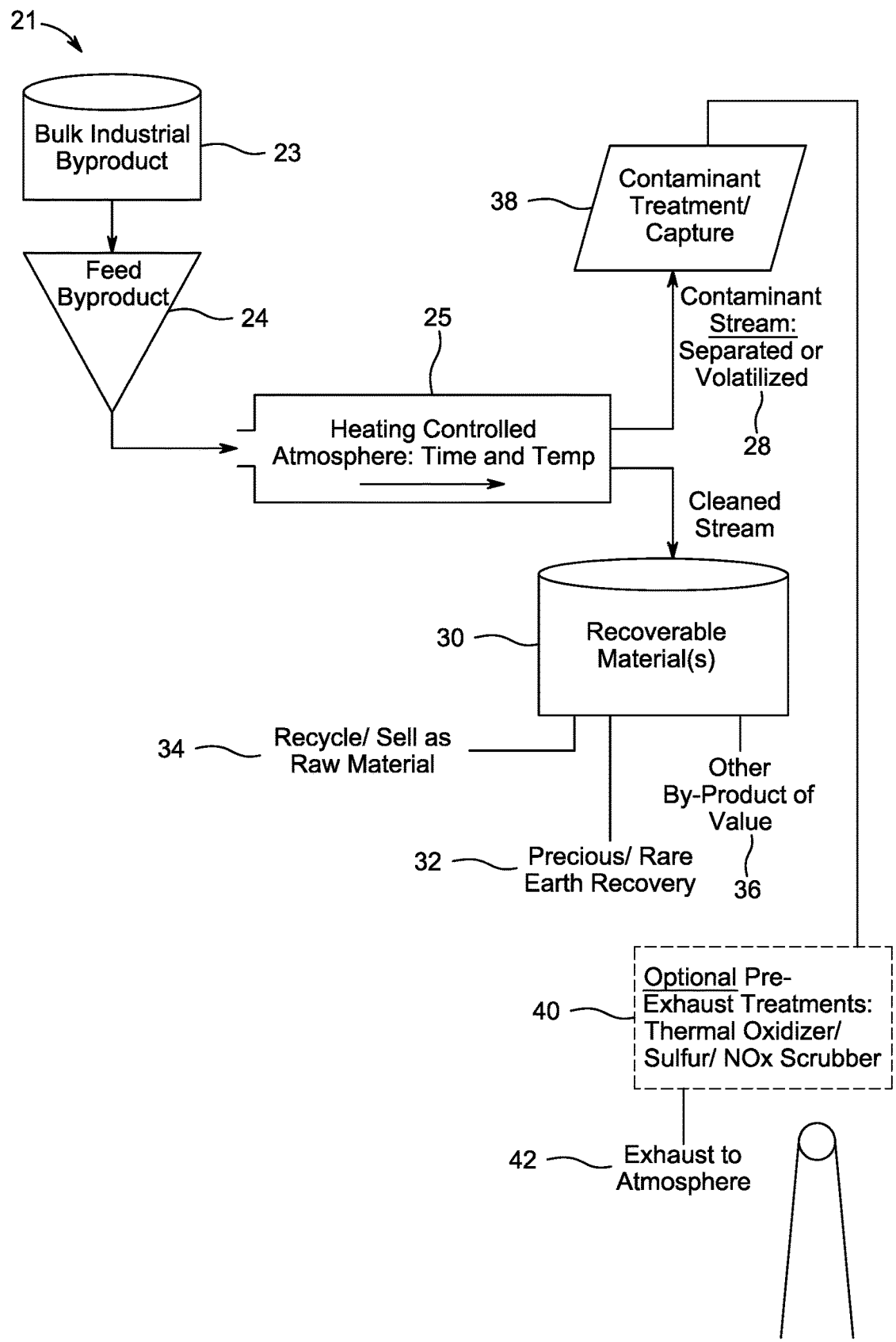
FIG. 4 is a schematic of one possible treatment system and related methods.

It will be appreciated that the process of heating the bulk quantity of contaminated industrial byproduct, whether in the form of spent activated carbon, sludge, dredge spoils, contaminated soils, gangue or other wastes from mining operations, smelting operations, contaminated soils, and refining operations, is performed with parameters of heating, time exposure, and controlled atmosphere which have been predetermined to result in separation of the inputted industrial byproduct into at least two streams: on the one hand, a contaminant stream, where the contaminants have been separated or volatilized; and, on the other hand, a cleaned stream, such cleaned stream containing recoverable materials therein (the foregoing shown in step 28 in FIG. 4). The cleaned stream may be in the form of powder or other particulate, and in whatever form, is substantially free of the plurality of contaminants associated with the industrial byproduct.

The desired material may thereafter be suitably collected, such as in the form of a second bulk quantity, such second bulk quantity being less than the bulk quantity associated with the initial contaminated industrial byproduct (step 30). The collection of such desired material may be accomplished through one or more processing steps resulting in material capture and bagging, such as systems shown schematically in FIG. 1 at 29. Depending on the desired material to be recovered, processing equipment such as cyclones 31 and high temperature bag houses 33 may be suitable for collecting the quantity of desired material.

The recoverable material collected in step 30 will likewise be further processed to recover precious/rare earth metals (step 32), or may be recycled or sold as a raw material, such as recovered lead, tin, or bismuth, in the case of a smelting operation (step 34), or the recovered materials may be used in situ or transported elsewhere if they have value in other industries (step 36).

Turning now to the contaminant stream generated by the aforementioned heating step, such contaminant stream may be subject of further treatment including treating with agents to capture the contaminants from the stream. One suitable treatment of the contaminant stream makes use of a water-soluble, alkaline-earth metal sulfide or polysulfide to form a non-leachable, stable compound in the form of particulate (step 38). Separate from, or in conjunction with, formation of such particulates, the stream may undergo further treatments prior to being exhausted to atmosphere, such as treatments with the thermal oxidizer, scrubbing, or other processes to reduce or remove sulphur, NOx or other regulated compounds (step 40), after which the further-treated, substantially contaminant-free stream may be compliantly exhausted into the air (step 42).

In certain implementations of this disclosure, the contaminant stream includes separated or volatilized heavy metals and other contaminants fed into or otherwise transferred to a treatment unit 35. In an illustrative embodiment, a treatment unit includes, but is not limited to, ductwork, chambers, and the like. A treating solution is injected or sprayed into the air stream containing the vaporized heavy metals and/or other contaminants, to thereby treat and at least partially remove heavy metals and/or other contaminants from the air stream. The liquid reagent itself, in one possible implementation, comes into substantial contact with the heavy metals and/or contaminants by means of injection, spraying or related airflow control so that reaction between the treating solution and substantial constituents of the air stream may occur.

In an illustrative embodiment, the treating solution is an aqueous spray solution containing a water soluble alkaline-earth sulfide and/or polysulfide. In one embodiment, the alkaline-earth metal polysulfide may be either a magnesium polysulfide or a calcium polysulfide, and the alkaline-earth metal polysulfide may be present in the solution in an amount of about one (1)% to about thirty-five (35)% in water. In another embodiment, the alkaline-earth metal polysulfide is a mixture of one or more magnesium polysulfides and one or more calcium polysulfides, wherein the polysulfides are present in the solution in an amount of about one (1)% to about thirty-five (35)% in water.

It should be appreciated by those skilled in the art that the amount of the alkaline-earth sulfide and/or polysulfide in the treating solution can vary outside of the ranges listed above. In many applications, the economic goal may be to use as little of the alkaline-earth sulfide and/or polysulfide as operationally possible. For example, the amount of the alkaline-earth sulfide and/or polysulfide used can vary dependent upon the dispersion in the air stream, the velocity of the air stream, the temperature of the air stream, the concentration of heavy metals and other contaminants in the air stream, and other parameters of the type.

The contaminant stream which is generated by heating the industrial byproduct to separate predetermined contaminants with the goal of recovering desired materials and the performance of the necessary heating steps at the required temperatures and residency times—all the foregoing influence or pose challenges to effective treatment of the contaminant stream with the treating solution, including solutions of alkaline-earth sulfide and/or polysulfide. To that end, a suitable contaminant treatment or capture system, generally referred to as a gas reactor shown at 35 (FIG. 1) has the following components and associated structures to effectively treat the contaminant stream:

Ductwork carrying the contaminant laden gas stream enters a reagent contact chamber wherein reagent comes into direct contact with the contaminant laden gas stream causing the contaminants to precipitate out of the gas stream as solid particles. These particles are carried as part of the combined reagent liquid/contaminant stream to a separation mechanism. The separation mechanism may be a weir, centrifuge, filter or other device specifically designed to separate solids and particles from a carrying liquid. The resulting liquid reagent is recirculated back through the gas reactor on a continual basis to minimize or avoid generating effluent. The gas reactor 35 may be configured as a single stage or as a multi-stage implementation, depending on the nature of the contaminants, the concentration of those contaminants within that gas stream, and other parameters of the contaminant stream.

Figure 5:
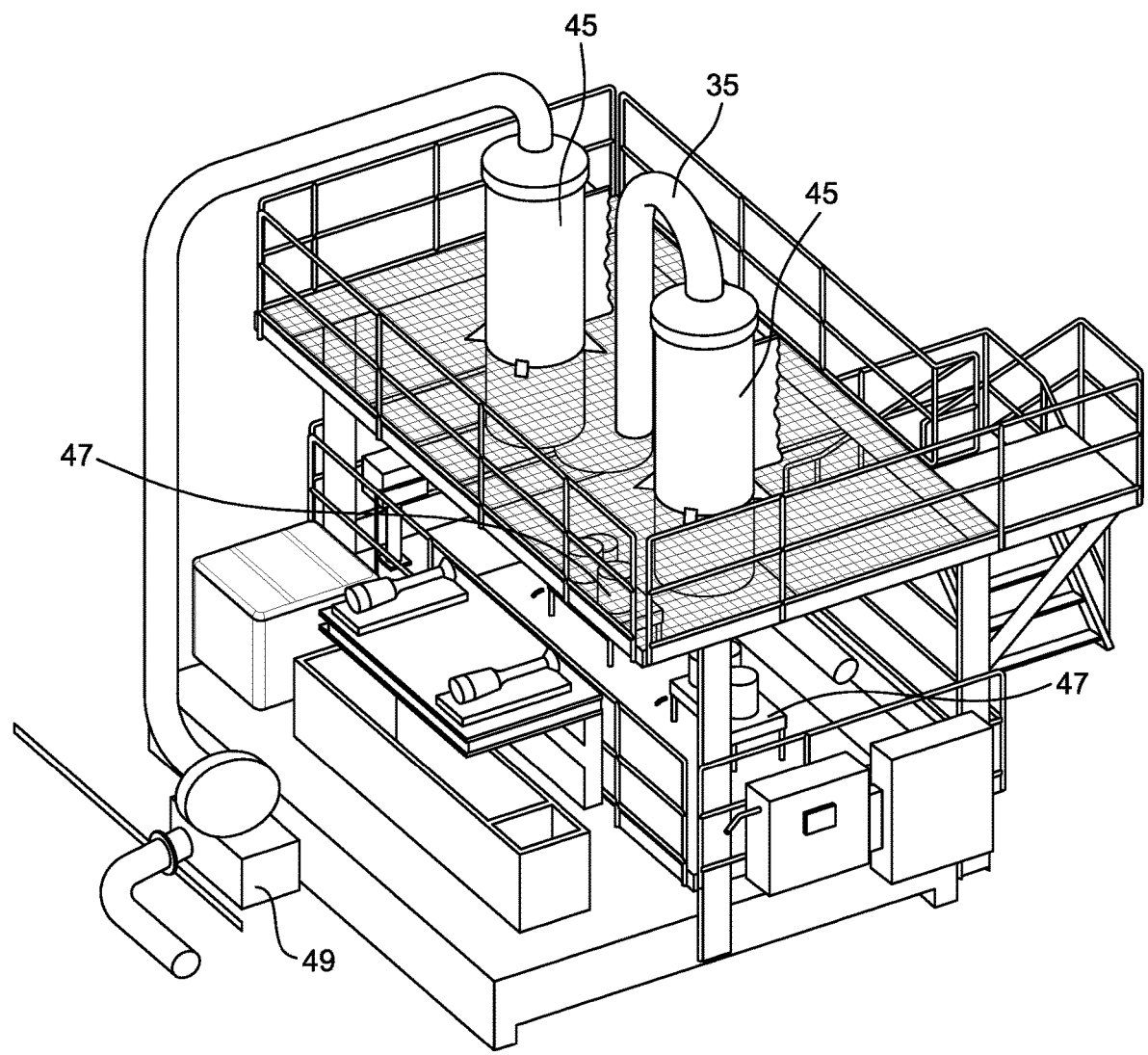
FIG. 5 is a partly schematic view of one possible contaminant treatment system.

FIG. 5 is a partly schematic view of one possible treatment unit or gas reactor 35 for performing suitable treatment of contaminants (step 38 of FIG. 4). When it is desirable to treat a predetermined contaminant having a sublimation point different from that of mercury, such predetermined contaminant may benefit from treatment unit or gas reactor 35 configured to include multiple stages 45, in this case comprising primary and secondary stages 45. The treatment reagent may be the same in each of the stages 45 and may likewise treat the contaminant stream in series, which treatment has resulted in increased capture rates of the contaminant as measured at the outlet of the two stages 45 of treatment unit or gas reactor 35. Alternately, different concentrations of the same reagent or different reagent compositions may be used in each of the two stages or multiple stages 45 of gas reactor 35, depending on the contaminants and the concentration of those contaminants within the contaminant stream.

Treatment unit or gas reactor 35 may include one or more centrifuges 47 which are part of a dispensing and circulatory system for the treatment reagent in liquid form, the liquid centrifuges being adapted to remove particulate or similar solids and solid particles being carried in the reagent liquid. As such, the treatment solution in the form of reagent has been rendered more effective by elimination of a measurable amount of captured particulate. Treatment unit or gas reactor 35 likewise may make use of conductivity or similar sensors 49 to measure the concentration of the reagent being used to treat the contaminant stream (which concentration is a function of electrical conductivity). Depending on the measurements of such conductivity, the treatment unit may adapt dosages of the reagent being introduced into one or more of the stages 45 of treatment unit 35, or may adapt constituents of such reagents in the case of multi-component treatment solutions.

In an illustrative embodiment, the treating solution may include one or more catalyst agents having a pH of about seven (7) or more to provide stabilization of the resulting precipitate. Alternatively, the resulting precipitate can be quarantined in a catalyst solution in order to stabilize the resultant precipitant and ensure the material is no longer leachable. However, it should be appreciated by those skilled in the art that depending on the pH of the target material and/or the air stream containing the vaporized heavy metals and/or other contaminants, the catalyst agent may not be used.

In another illustrative embodiment, the treating solution may include one or more surfactants, dispersants, and/or hyperdispersants. Additionally, the treating solution may include the alkaline-earth sulfide and/or polysulfide, one or more surfactants, dispersants, and/or hyper dispersants, and one or more catalyst agents.

In an illustrative embodiment, upon treating the air stream with the treating solution the vaporized heavy metals and/or other contaminants precipitate out of the air stream, and the precipitate may be filtered out. The precipitate may be filtered out through a centrifuge, vacuum belt, or weir followed by a particulate filter. In this regard, the collected heavy metals and/or other contaminants can then be further processed, recycled or otherwise disposed of properly. The remaining clean air is then exhausted to the atmosphere through a particulate collection system. Any residue which is further captured in the particulate collection system may be returned to the feed storage bin.

In an illustrative embodiment, the treatment system and method illustrated in FIG. 1 may be used to treat the spent activated carbon and/or industrial byproducts, dredge spoils or contaminated soils on a continuous basis or a non-continuous basis to remove heavy metals and/or other contaminants from the spent activated carbon and/or industrial byproducts, dredge spoils or contaminated soils as the concentrations increase in the spent activated carbon and/or industrial byproducts, dredge spoils or contaminated soils.

The non-continuous basis may be tailored to or in response to measurements of the amount of mercury and/or other heavy metals taken from one or more samples of the spent activated carbon and/or industrial byproducts, dredge spoils or contaminated soils.

In an illustrative embodiment, the volatilization vessel may take a variety of forms, including, but not limited to, indirectly heated rotating drum, ductwork, chambers, and other vessels of the type. The particulate collection system may be any of the variety of apparatus suitable for capturing, filtering, or otherwise collecting dust from industrial plants and other various operations. Given the variety of industrial plant or mining site configurations possible, it should be appreciated by those skilled in the art that the particulate collection system, as well as the apparatus or system for treating the spent activated carbon and/or industrial byproducts, dredge spoils or contaminated soils may be operatively associated with one or more operations of the industrial plant or mining site capable of receiving material for treatment, at any number of suitable locations relative to the components of the industrial plant or mining site.

EXAMPLE 1

FIG. 2 sets out test results for one potential industrial byproduct, in this case weak acid sludge from a lead smelter, in which the materials desired to be recovered include lead, tin and bismuth. The recovered materials may be used as raw material for lead smelting or other related processes where such recovery materials would have application, or as a cleaned byproduct for still other related industrial processes. Five tests were performed on the sludge from a bulk quantity thereof generated in a lead smelting operation. The airflow in a controlled environment was about −0.5 PSI and the sludge was heated in the volatilization vessel 25 at a temperature ranging between about 450° C. and about 550° C. for a time range of about 60 to 90 minutes. The control environment was one atmosphere when at ambient temperature, such pressure varying as a function of temperature in the vessel. The concentrations of the plurality of contaminants in the sludge were measured at an inlet point shown as reference 21 in FIG. 1, it being understood that such reference is exemplary only and the inlet measurement point is any suitable location prior to heating of the industrial byproduct as described herein. After heating steps described herein, test measurements were made in four separate runs at outlet points after heating in calciner 25 and/or after treatment in unit 35, to evaluate the capture rates of the plurality of contaminants, as well as to determine the reduction in the amount of the lead, tin and bismuth or other material amounts desired to be recovered. In all instances, capture rates of contaminants and desired recovery materials exceeded 90% and, in this test, exceeded 95%, including capture rates of the desired recovery materials of lead, tin and bismuth exceeding 98%.

EXAMPLE 2

In another potential application of this disclosure, spent, granular activated carbon has been treated for purposes of not only removing heavy metals therefrom, but also for concentrating precious metals known to be present. The spent, granular activated carbon was received as a byproduct from mining operations. Table of FIG. 3 sets out results of subjecting the spent, granular activated carbon to a temperature range of about 510° C. to about 732° C. in a controlled atmosphere, such as one atmosphere (when at ambient temperature) with airflow limited to between −3.0 and +3.0 PSI, with the exposure to the above temperature range occurring over a time period ranging from about two hours to about four hours. As set out in the table of FIG. 3, not only were the heavy metal contaminants of mercury and cadmium captured at rates exceeding 90% (92% for cadmium and 99% for mercury), but heating of the spent, granular activated carbon was sufficient to reduce such material to ash and thereby increase the concentration of precious metals, including gold, silver and platinum, alone or in various combinations, by about 294% by ppm in the contaminated industrial byproduct before heating compared to the ppm in the resultant ashed carbon. The resultant ashed carbon was observed to either assume powder form or, in terms of visual form (not chemical composition) resembled the appearance of a partially combusted charcoal "briquette." In other words, the test results demonstrate that the methods and systems of this disclosure result in concentrations of recoverable materials, including precious metals or rare earth metals, increasing in a cleaned stream of material, making subsequent processing or recover of precious metals or rare earth metals more effective and efficient, or making recycling or reuse of the cleaned stream possible consistent with environmental regulations.

Although the treatment systems and methods have been described and illustrated in connection with certain embodiments, many variations and modifications will be evident to those skilled in the art and may be made without departing from the spirit and scope of the invention. The disclosure is thus not to be limited to the precise details of methodology or construction set forth above as such variations and modifications are intended to be included within the scope of the disclosure.

What is claimed is:

1. A method for treating an industrial byproduct comprising:
   providing the industrial byproduct, the industrial byproduct selected from the group consisting of spent, granular, activated carbon, dredge spoils, weak acid sludge, and contaminated soils,
   heating the industrial byproduct to separate at least one heavy metal from the industrial byproduct to create first and second streams consisting essentially of, respectively, a clean material stream and a gas stream containing at least one of a heavy metal and a contaminant;
   retaining the first, clean material stream at sufficiently high temperature and for a sufficient period of time to cause the volatilization of any carbons and/or hydrocarbons present into the second gas stream;
   combining the second gas stream with a water soluble alkaline-earth metal sulfide to create a third combined stream;
   removing at least a portion of the industrial byproduct from the third combined stream to create a fourth, remaining combined stream;
   passing the fourth remaining combined stream to a volatilization vessel as combustion air; and
   passing the remaining combined stream through at least one of a thermal oxidizer, sulfur scrubber, and NOx scrubber to achieve emissions standards in the fourth, remaining combined stream at the exhaust stack.

2. The method of claim 1, wherein the step of combining the second gas stream with the water soluble alkaline-earth metal sulfide includes combining a catalyst with the second gas stream.

3. The method of claim 1, wherein the step of combining the second gas stream with the water soluble alkaline-earth metal sulfide includes combining a surfactant or hyperdispersant with the second gas stream.

4. The method of claim 1, wherein the heating step includes heating the at least one of the spent activated carbon and/or industrial byproducts, dredge spoils or contaminated soils an inert atmosphere.

5. The method of claim 1, wherein the step of retaining the first, clean material stream at sufficiently high temperature and for a sufficient period of time comprises allowing the industrial byproduct to volatilize to create a residual ash having at least one of a precious metal and a rare earth element at a concentration therein higher than prior to the retaining step, the residual ash having a form suitable for subsequent collection.

6. The method of claim 1, wherein the step of combining the second gas stream with the water soluble alkaline-earth metal sulfide includes spraying the water soluble alkaline-earth metal sulfide into the second, gas stream.

7. The method of claim 1, further comprising passing the fourth, remaining combined stream through at least one of a particulate filter, centrifuge, and a weir to concentrate and remove precipitate from the fourth, remaining combined stream.

8. A method for recovering a desired material from a first bulk quantity of a contaminated industrial byproduct, the method comprising:
receiving the contaminated industrial byproduct from an industrial process selected from the group consisting of at least one of mining operations, smelting operations, contaminated soils, and refining operations, wherein the contaminated industrial byproduct is known to contain a plurality of contaminants including at least one predetermined contaminant having a sublimation point different from the sublimation point of mercury;
determining in the received industrial byproduct a likelihood that the desired material sought to be recovered is present therein;
heating the first bulk quantity of the industrial byproduct in a controlled atmosphere for a time period and at a temperature sufficient to separate the predetermined contaminant to form a contaminant stream and a cleaned stream, wherein the cleaned stream includes the desired material for recovery therein and is substantially free of the plurality of contaminants;
collecting a second bulk quantity of the desired material, the second bulk quantity being less than the first bulk quantity, whereby the desired material has been recovered from the contaminated industrial byproduct;
treating the contaminant stream with a water-soluble, alkaline-earth metal sulfide or polysulfide to form a non-leachable, stable compound in the form of particulate;
capturing the particulate to remove the particulate from the contaminant stream and form a cleaned exhaust stream; and
discharging the exhaust stream into air.

9. The method of claim 8, wherein the heating step comprises heating the industrial byproduct for a time period and at a temperature selected to volatilize the predetermined contaminant.

10. The method of claim 8, wherein the heating step comprises heating in a controlled atmosphere that includes airflow limited to between −3.0 psi to +3.0 psi.

11. The method of claim 10, wherein the step of receiving the industrial byproduct comprises receiving a weak acid sludge from a lead smelting operation having the predetermined contaminant comprising at least one of arsenic and cadmium;
wherein the step of determining the likelihood of the presence of the desired material to be recovered comprises determining the presence of at least one of lead, tin, and bismuth as the desired material to be recovered;
wherein the step of heating the industrial byproduct further comprises heating the weak acid sludge for a time period ranging between about 60 minutes to about 90 minutes and at a temperature ranging between about 450° C. and 550° C.;
wherein the heating step further includes a controlled atmosphere in which the airflow is substantially maintained at −0.5 psi during a majority of the time period; and
wherein the step of collecting the second bulk quantity of the desired material comprises collecting particulate containing at least one of lead, tin and bismuth, whereby the collected material comprises recovered material.

12. The method of claim 11, further including the step of recycling the recovered material into a raw material for use in a subsequent lead smelting operation.

13. The method of claim 8, wherein the step of receiving the industrial byproduct comprises receiving contaminated, spent, granular activated carbon and, the at least one predetermined contaminants comprises two predetermined contaminants of mercury and cadmium;
wherein the step of determining a likelihood that the desired material is present in the industrial byproduct comprises determining that the spent, granular activated carbon comprises at least one precious metal selected from the group consisting of gold, silver, and platinum;
wherein the step of heating the industrial byproduct comprises heating the spent, granular activated carbon at a temperature selected from the range of about 510° C. to about 732° C. and for a period of time ranging from about 2 hours to about 4 hours, and selected to reduce the spent, granular activated carbon to ash and give off volatiles comprising carbon monoxide and hydrogen and undergo a controlled combustion process, whereby the quantity of ash generated by the foregoing heating step is substantially less than the bulk quantity of the spent, granular activated carbon and the percentage of the desired material in the form of the at least one precious metal is more concentrated in the resulting ash than in the bulk quantity of the spent, granular activated carbon; and
wherein the step of collecting the bulk quantity of the desired material comprises collecting the at least one precious metal contained in the ash generated in the previous heating step.

14. The method of claim 13, wherein the heating step further comprises exposing the spent, granular activated carbon to sufficient heat for a sufficient period of time so that the reduction to ash reduces the mass of the bulk quantity of the spent, granular activated carbon by at least 50%.

15. The method of claim 13, wherein the step of heating the spent, granular activated carbon comprises exposing the spent, granular activated carbon to sufficient heat for a sufficient timeframe to reduce the mass of the bulk quantity of the spent, granular activated carbon by at least 80%.

16. The method of claim 13, wherein the step of heating the spent, granular activated carbon comprises exposing the spent, granular activated carbon to sufficient heat for a sufficient period of time to increase the concentration of the at least one precious metal in the resulting ash by at least 200%.

17. The method of claim 13, wherein the step of heating the spent, granular activated carbon comprises exposing the spent, granular activated carbon to sufficient heat for a sufficient period of time to concentrate the at least one precious metal in the resulting ash by about 290%.

18. The method of claim 8, wherein the step of receiving the industrial byproduct comprises receiving an industrial byproduct selected from the group consisting of spent, granular activated carbon, dredge spoils, sludge, and contaminated soils, having the predetermined contaminant comprises at least one of cadmium and arsenic, and wherein the step of treating the contaminant stream is performed with sufficient heat, for a sufficient time period, and with a sufficient amount of water-soluble alkaline-earth metal sulfide to cause the predetermined contaminant to be captured at a rate greater than 90%.

19. The method of claim 8, wherein the step of determining likelihood of the desired material comprises determining likelihood of at least one of the group consisting of cleaned carbon, precious metals, rare earth metals, tin, bismuth, and lead, being present in the contaminated industrial product.

20. The method of claim 19, wherein the step of determining the likelihood of the desired material comprises determining the likelihood of rare earth metals useful as raw materials for industrial processes related to at least one of batteries, semiconductors, and superconductors.

* * * * *